US006921023B1

(12) United States Patent
Bright et al.

(10) Patent No.: US 6,921,023 B1
(45) Date of Patent: Jul. 26, 2005

(54) SELF-CONTAINED WATER DISPLAY

(76) Inventors: Mark A. Bright, 1391 Olympic St., Springfield, OR (US) 97477; Lawrence K. Bright, 81949 Lost Valley La., Dexter, OR (US) 97431

( * ) Notice: Subject to any disclaimer, the term of this patent is extended or adjusted under 35 U.S.C. 154(b) by 102 days.

(21) Appl. No.: 10/663,882

(22) Filed: Sep. 15, 2003

(51) Int. Cl.$^7$ ............................................. B05B 17/08
(52) U.S. Cl. ........................... 239/17; 239/18; 239/20; 239/23; 137/563; 137/565.01
(58) Field of Search ............................ 239/17, 18, 20, 239/23; 137/563

(56) References Cited

U.S. PATENT DOCUMENTS

| | | | | |
|---|---|---|---|---|
| 1,798,095 | A | * 3/1931 | Manley | 222/129.4 |
| 5,439,170 | A | * 8/1995 | Dach | 239/18 |
| D394,301 | S | * 5/1998 | Fisher | D23/201 |
| D431,875 | S | 10/2000 | Gutierrez | |
| 6,135,604 | A | * 10/2000 | Lin | 362/101 |
| 6,237,858 | B1 | * 5/2001 | Lewis | 239/18 |
| D461,222 | S | 8/2002 | Bright et al. | |

FOREIGN PATENT DOCUMENTS

GB          2040531 A   *  8/1980   ........... G09F 19/10

* cited by examiner

*Primary Examiner*—David A. Scherbel
(74) *Attorney, Agent, or Firm*—Robert E. Howard

(57) ABSTRACT

A self-contained water display. The water display includes a cylindrical fountain housing. The fountain housing contains at least one fountain nozzle extending vertically upwardly, and at least one pump adapted to supply water to the nozzle with sufficient volumetric throughput to cause a vertical water stream to be ejected therefrom. A vertically disposed transparent cylindrical cover surrounds the fountain housing with the fountain housing being located in a lower portion of the transparent cylindrical cover. The transparent cylindrical cover has a height above the nozzle that is at least as great as the height of the vertical water stream generated by the fountain nozzle. The fountain housing and the lower portion of the transparent cylindrical cover are surrounded by a lightweight shell simulating a rock. The water display may include a transparent aquarium surrounding the fountain housing and transparent cylindrical cover.

22 Claims, 5 Drawing Sheets

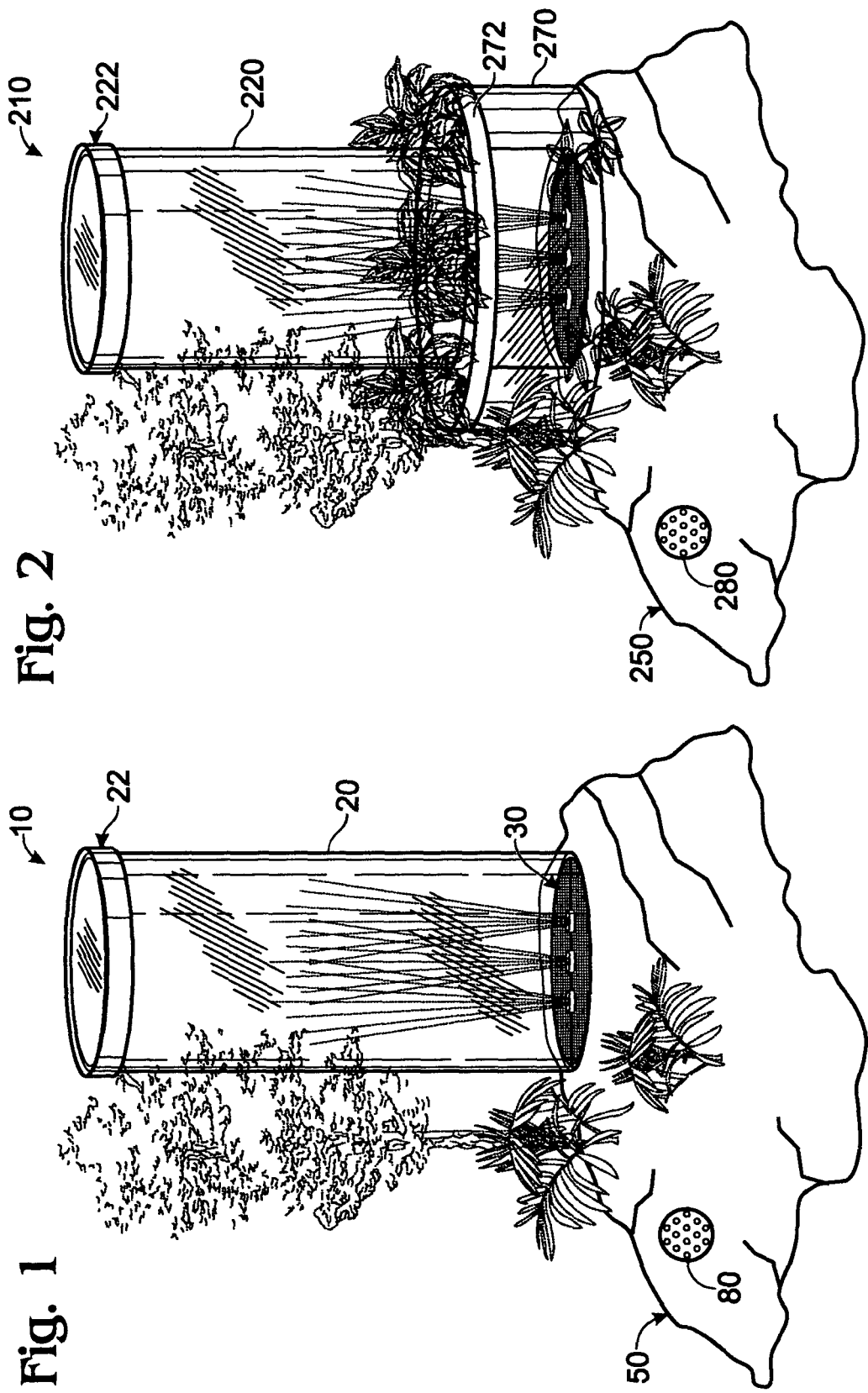

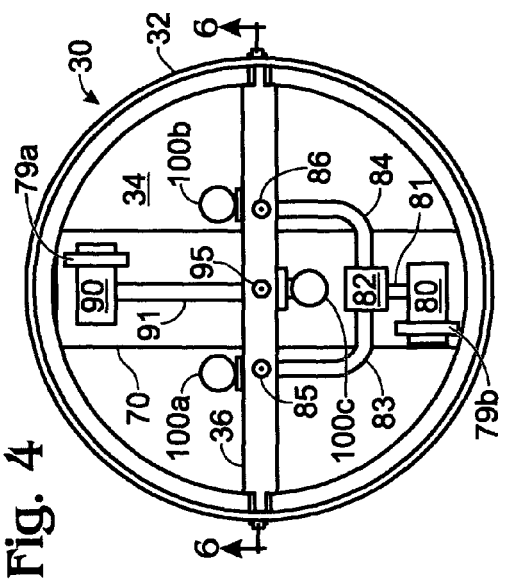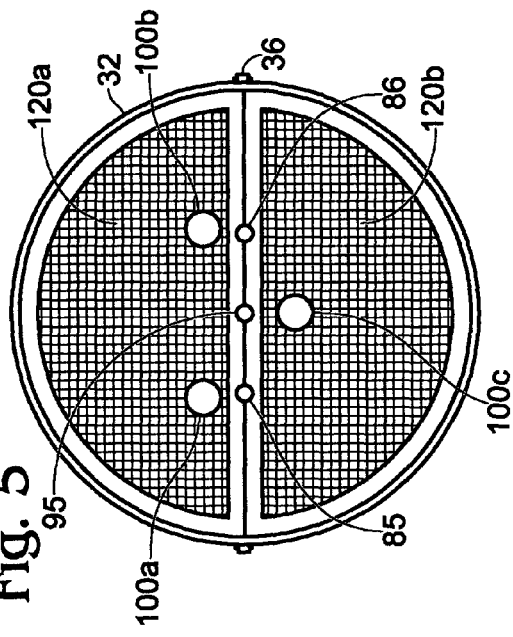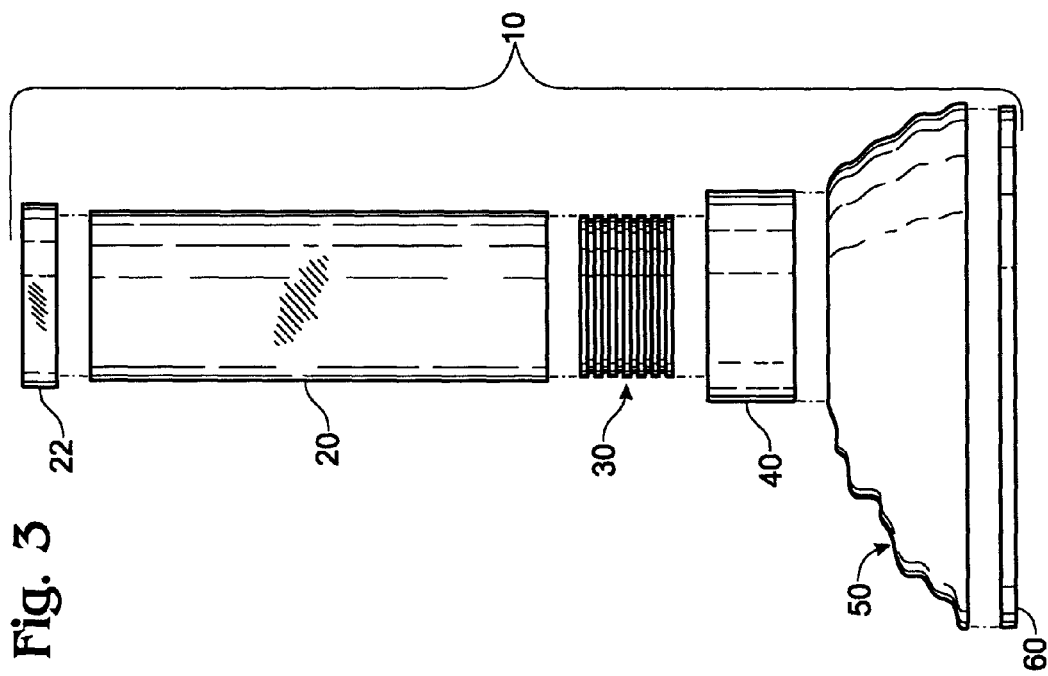

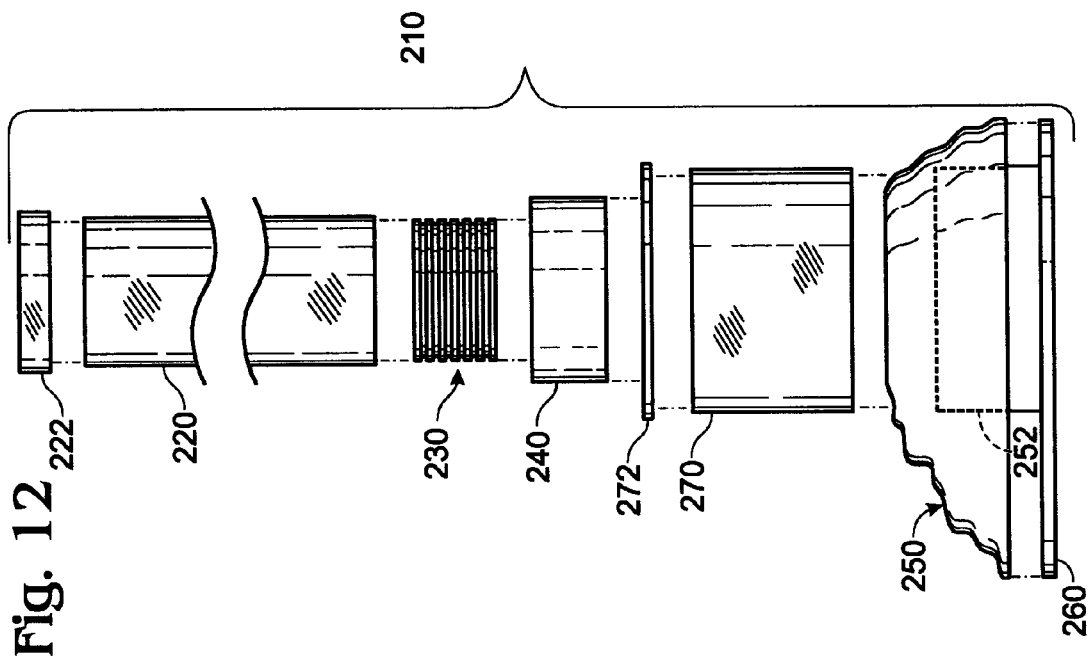
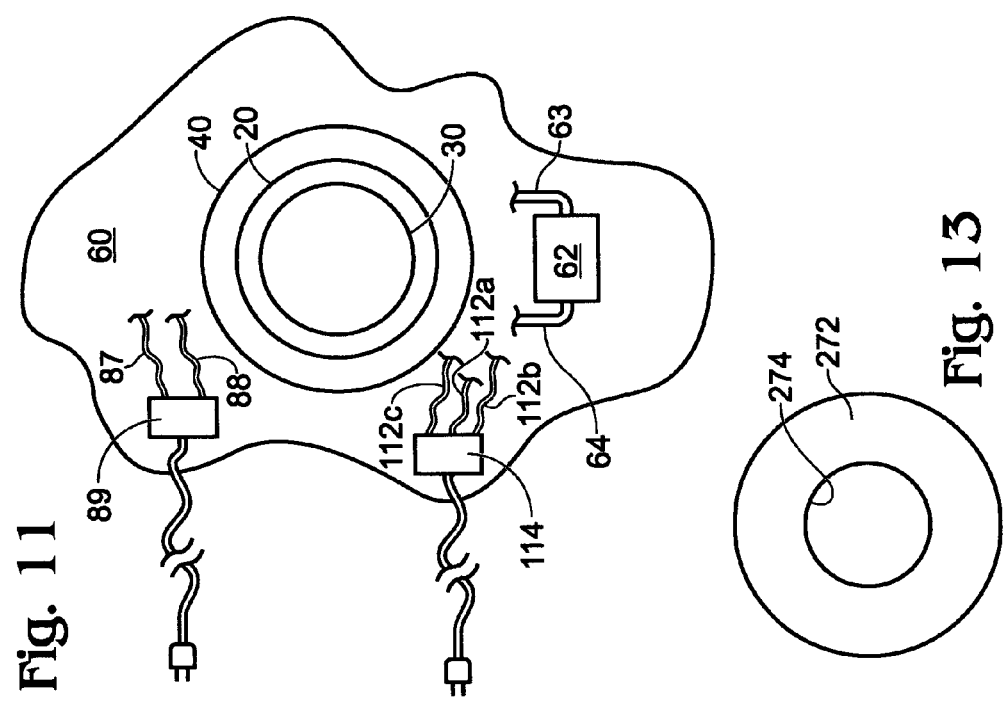

SELF-CONTAINED WATER DISPLAY

BACKGROUND OF THE INVENTION

The present invention relates to a self-contained water display that may be used indoors or in confined areas. The water display includes a water fountain, and may additionally include an aquarium.

Outdoor water fountains have been around for centuries, and take many forms. One type of outdoor fountain is sold by Superior Innovative Products, Inc. of Springfield, Oreg. under the trademark "Fountain Systems". The housing for this water fountain is described in U.S. Design Patent D461,222, the entire contents of which are hereby incorporated by reference.

It would be desirable to provide a water fountain that can be placed indoors, or in other confined spaces, without the danger of water being sprayed into undesirable locations.

SUMMARY OF THE PRESENT INVENTION

The present invention is a self-contained water display. The water display includes a cylindrical fountain housing. The fountain housing contains at least one fountain nozzle extending vertically upwardly, and at least one pump adapted to supply water to the nozzle with sufficient volumetric throughput to cause a vertical water stream to be ejected therefrom. A vertically disposed transparent cylindrical cover surrounds the fountain housing with the fountain housing being located in a lower portion of the transparent cylindrical cover. The transparent cylindrical cover has a height above the nozzle that is at least as great as the height of the vertical water stream generated by the fountain nozzle.

The fountain housing and the lower portion of the transparent cylindrical cover are surrounded by a lightweight shell simulating a rock.

The water display of the present invention may include a transparent aquarium surrounding the fountain housing and transparent cylindrical cover.

BRIEF DESCRIPTION OF THE DRAWINGS

FIG. 1 is a front perspective view of the self-contained water display of the present invention, wherein the water display is a water fountain;

FIG. 2 is a front perspective view of the self-contained water display of the present invention, wherein the water display includes a water fountain and an aquarium;

FIG. 3 is an exploded front elevation view of the self-contained water display of the present invention, wherein the water display is a water fountain;

FIG. 4 is a top plan view of the fountain housing of the self-contained water display of the present invention, the fountain housing being shown without the cover grates in place;

FIG. 5 is a top plan view of the fountain housing of the self-contained water display of the present invention, the fountain housing being shown with the cover grates in place;

FIG. 11 is a top plan view of the base of the self-contained water display of the present invention;

FIG. 12 is an exploded front elevation view of the self-contained water display of the present invention, wherein the water display includes a water fountain and an aquarium; and FIG. 13 is a top plan view of the aquarium lid of the self-contained water display of the present invention.

DESCRIPTION OF PREFERRED EMBODIMENTS

Figure 6:
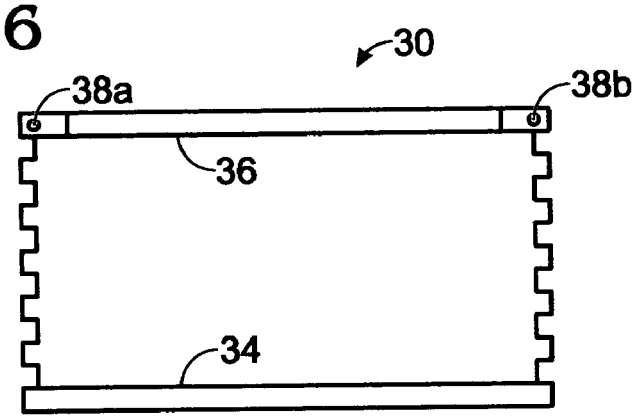
FIG. 6 is a cross-sectional view taken along line 6—6 of FIG. 4 of the fountain housing of the self-contained water display of the present invention, shown without the pumping and lighting subassemblies for sake of clarity.

The water fountain 10 of the present invention includes a transparent cylindrical cover 20 having a transparent lid 22, a fountain housing 30, a plastic tub 40, a lightweight shell cover 50 simulating a rock, and a floor 60.

Transparent cylindrical cover 20 is preferably made of a lightweight, scratch resistant transparent polymer, such as a polycarbonate. Transparent cylindrical cover 20 can be made from a sheet of lightweight, scratch resistant, transparent polymer by bringing the two longitudinal edges of the sheet into a slightly overlapping relationship and attaching the edges together by suitable means, such as threaded fasteners. Transparent lid 22, which fits onto the upper open end of transparent cylindrical cover 20, is made of the same material.

Fountain housing 30 has a wall 32, a floor 34, and is open at the top. Wall 32 is formed of two semi-cylindrical elements fastened together along adjacent vertical edges to form a cylinder. The cylindrical wall 32 is fastened to floor 34. Wall 32 preferably has substantially the same appearance as that shown in applicants' U.S. Design Patent D461,222, i.e., it preferably is corrugated which provides additional rigidity to the wall structure. However, the wall of fountain housing 30 can be smooth.

Figure 8:
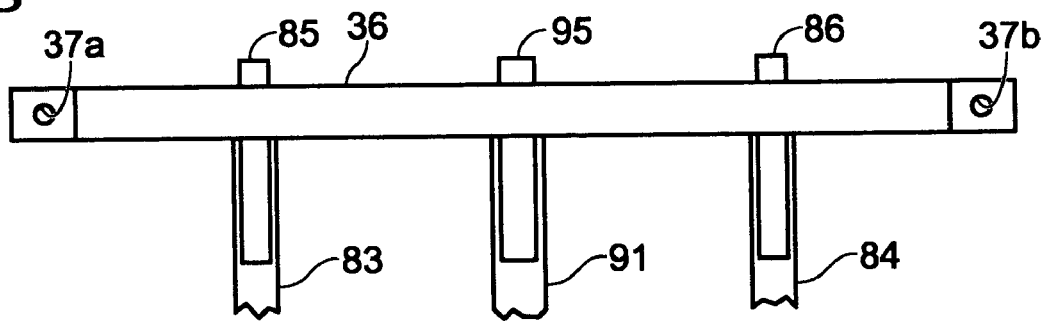
FIG. 8 is a front elevation view of the top cross bar of the fountain housing of the self-contained water display of the present invention.

A cross bar 36 extends across the top of fountain housing 30, as shown. Pins 38a and 38b (FIG. 6) extend from one of the two halves of cylindrical wall 32 and through openings 37a,37b (FIG. 8) located in the ends of cross bar 36. This arrangement provides rigidity to the open upper end of fountain housing 30.

Figure 7:
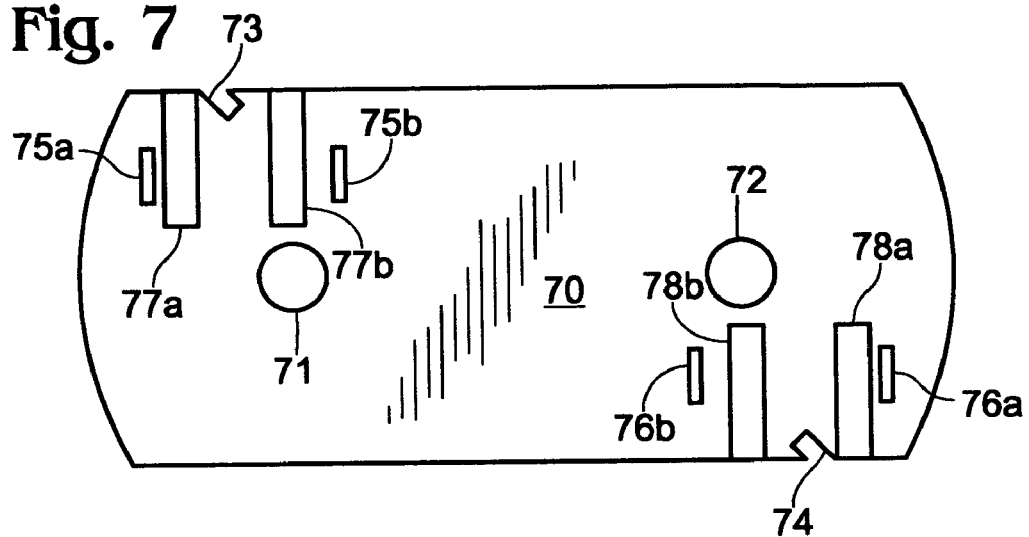
FIG. 7 is a top plan view of the pump mounting platform of the self-contained water display of the present invention.

A pump subassembly rests on the floor 34 of fountain housing 30. As best seen in FIG. 7, the pump subassembly includes a platform 70 having pump wiring orifices 71 and 72 and pump wiring slots 73 and 74. A first pair of strap slots 75a and 75b are located at the first end of platform 70 and a second pair of strap slots 76a and 76b are located at the second end of platform 70. A first pair of hook and loop fastener elements 77a and 77b are located inwardly of the first pair of slots 75a and 75b, and a second pair of hook and loop fastener elements 78a and 78b are located inwardly of the second pair of slots 76a and 76b.

As best seen in FIG. 4, a pair of identical submersible pumps 80 and 90 are located at the first and second ends of platform 70. The pumps can have any desired volumetric throughput rating. For a fountain having a height of about seven feet, a central nozzle 95 having a diameter of about ¾ inch, and two outer nozzles 85 and 86 having a diameter of about ½ inch, a throughput of 2400 gallons per hour per pump has been found to produce satisfactory streams. The wiring 87 (FIG. 11) supplying power to pump 80 exits through wiring orifice 71 and wiring slot 73. Similarly, the wiring 88 (FIG. 11) supplying power to pump 90 exits through wiring orifice 72 and wiring slot 74. Wiring 87 and 88 extend up over the open upper end of housing 30, under the bottom of cover 20, and over the top of tub 40 where they then communicate with a power source via junction box 89, which can be attached to floor 60.

Hook and loop fastening elements (not shown) are attached to the bottom of each of pumps 80 and 90, and are adapted to mate with the pairs of hook and loop fastener elements 77a,77b and 78a,78b, respectively. Hook and loop strap elements 79a and 79b can be passed through the pairs of slots 75a, 75b and 76a, 76b and around pumps 80 and 90, respectively, as best seen in FIG. 4. The hook and loop strap elements 79a and 79b mate with hook and loop elements fastened to the tops of each of pumps 80 and 90; the opposite sides of the straps 79a and 79b also mate.

Water contained within fountain housing 30 is sucked into pump 80 through its intake opening and is pumped through flexible conduit 81 and into pressure balancing valve 82. From pressure balancing valve 82 the water is pumped through flexible conduits 83 and 84 and through outer nozzles 85 and 86, respectively.

Water contained within fountain housing 30 is sucked into pump 90 through its intake opening and is pumped through flexible conduit 91 and through central nozzle 95.

Since pump 80 feeds the two outer nozzles 85 and 86, the height of the resulting water streams are less than the height of the water stream produced by pump 90 and central nozzle 95.

Water contained within fountain housing 30 is continuously filtered by passing it through a biofilter/pump assembly 62 via suction inlet conduit 63 and return conduit 64, as best seen in FIG. 11. Biofilter/pump assembly 62 is attached to floor 60.

Figure 10:
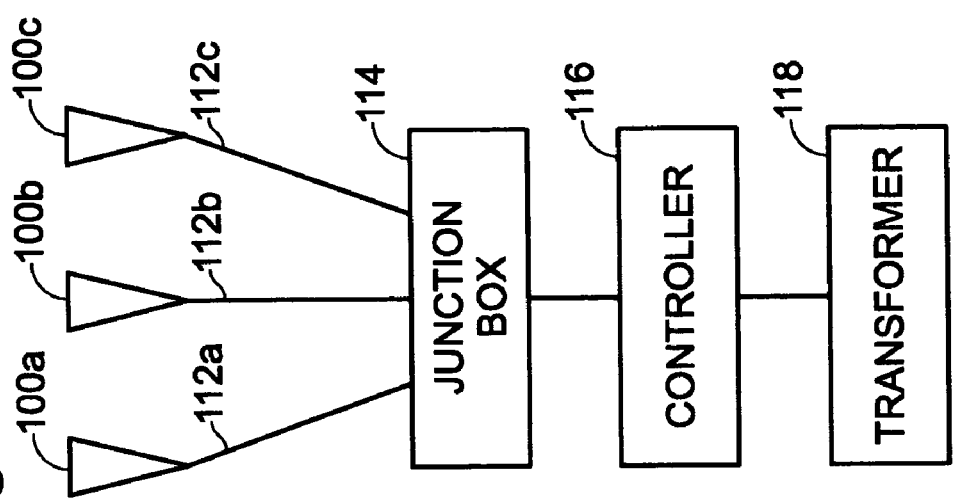
FIG. 10 is an electric schematic of the lighting system.
Figure 9:
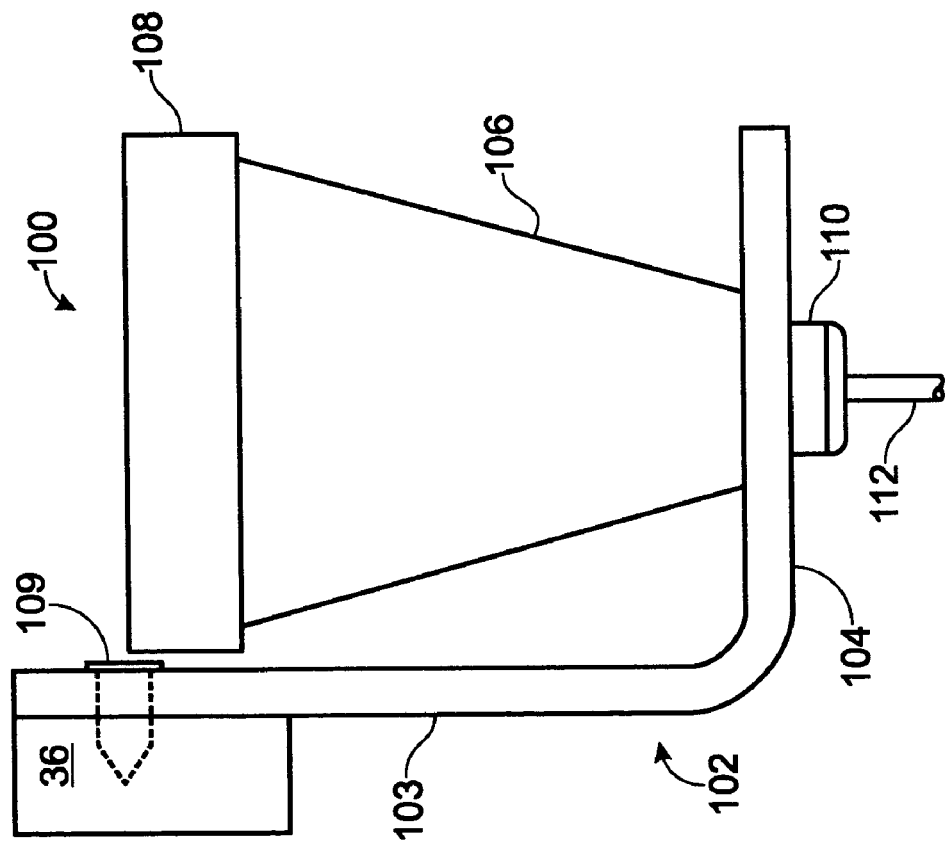
FIG. 9 is a side elevation view of one of the lights of the self-contained water display of the present invention.

Lights 100a, 100b, and 100c are attached to cross bar 36 by means of brackets 102, each bracket 102 having a vertical leg 103 and a horizontal leg 104, as best seen in FIG. 9. Lights 100 include a conical housing 106 having a removable lid 108 that has a circular central opening through which the light element is exposed. Threaded fastener 109 secures bracket 102 to crossbar 36. A nut 110 secures housing 106 to the horizontal leg 104 of bracket 102. An electrical wire 112 is connected to a junction box 114 which is connected to a controller 116 and a low voltage (12 volts, 800 milliamps) DC power source (transformer) 118 (FIG. 10).

Each of the light elements of lights 100 contains a plurality of LED bulbs, some of the bulbs capable of emitting red light, some of the bulbs capable of emitting blue light, and some of the bulbs capable of emitting green light.

Preferably, each of the light elements contain twenty seven LED bulbs, nine of which bulbs are capable of emitting red light, nine of which bulbs are capable of emitting blue light, and nine of which bulbs are capable of emitting green light.

The light elements are electrically connected to a controller 116 adapted to energize certain of the LED bulbs at certain times. The controller 116 can be adapted to energize the LED bulbs in response to an audio input.

Grate covers 120a and 120b (FIG. 5) are secured to the top of fountain housing 30 by threaded fasteners or other suitable removable attachment members.

Lightweight shell cover 50 is a hollow shell simulating a rock, and can be made of any suitable lightweight material, such as fiberglass or any other faux rock material. Simulated rock shell cover 50 has a circular opening at its top (FIG. 1) that is substantially the same diameter as transparent cylindrical cover 20. Its height is preferably such that the top of simulated rock shell cover 50 is substantially at the same level as the top of fountain housing 30. Simulated rock 50 may have any aesthetically pleasing shape.

As best seen in FIG. 11, floor 60 has the same "footprint" or outline as the bottom of simulated rock shell cover 50. Although plastic tub 40 has been described as being an element separate from floor 60, the two can be integral, i.e., molded as one piece.

FIGS. 2, 12 and 13 show a self-contained water display 210 wherein the water display includes a cylindrical aquarium 270. The water fountain portion of water display 210 is the same as discussed above relative to water fountain 10, with common elements having the same reference numbers but increased by 200. Thus, the water fountain includes a transparent cylindrical cover 220 having a transparent lid 222, a fountain housing 230, a plastic tub 240, a simulated rock shell cover 250, and a floor 260. The cylindrical plastic tub 240 containing the cylindrical fountain housing 230 and transparent cylindrical cover 220 sits inside cylindrical aquarium 270, resting on its floor. The cylindrical aquarium 270 sits on an aquarium stand 252 located within simulated rock shell cover 250 and attached to or resting on floor 260. The plastic tub 240, cylindrical fountain housing 230, transparent cylindrical cover 220 and cylindrical aquarium 270 all have a common axis.

Lid 272 of cylindrical aquarium 270 has a circular opening 274 having substantially the same diameter as transparent cylindrical cover 220, and through which transparent cylindrical cover 220 passes.

In both water display versions 10 and 210, real or synthetic plants can be placed into openings located in simulated rock shell covers 50 and 250, as shown in FIGS. 1 and 2. Plants can also be placed on the lid 272 of aquarium 270, as shown in FIG. 2.

Simulated rock shell covers 50 and 250 can also include a CD player (not shown) and one or more speakers 80 and 280, respectively. The CD player can be connected to the lighting system to cause the lights to vary in color to the tune of the music.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A self-contained water display comprising:
   a cylindrical fountain housing, said fountain housing having a floor, a cylindrical wall, and an open top, said fountain housing containing at least one fountain nozzle extending vertically upwardly and at least one pump adapted to supply water to said nozzle with sufficient volumetric throughput to cause a vertical water stream to be ejected from said nozzle; and
   a vertically disposed transparent cylindrical cover surrounding said fountain housing, said fountain housing being located in a lower portion of said transparent cylindrical cover, said transparent cylindrical cover having a height above said nozzle that is at least as great as the height of said vertical water stream.

2. The water display of claim 1 wherein said transparent cylindrical cover has a transparent lid.

3. The water display of claim 1 wherein said fountain housing is located within a tub.

4. The water display of claim 3 wherein said tub is surrounded by a lightweight shell cover simulating a rock, said shell cover having an irregularly shaped base.

5. The water display of claim 4 wherein said tub rests on a floor that has substantially the same footprint as the base of said shell.

6. The water display of claim 5 wherein said tub and said floor are integral.

7. The water display of claim 1 wherein there are three fountain nozzles extending vertically upwardly.

8. The water display of claim 7 wherein there is a first pump adapted to supply water to one of said nozzles, and a second pump adapted to supply water to the other two nozzles.

9. The water display of claim 8 wherein said second pump supplies water to the other two nozzles via a pressure regulator.

10. The water display of claim 8 wherein said pumps are mounted on a platform which rests on the floor of said fountain housing.

11. The water display of claim 7 wherein a cross bar extends across the top of said fountain housing, and said nozzles are positioned along said cross bar.

12. The water display of claim 7 wherein a light fixture is positioned adjacent to each of said nozzles, said light adapted to project a beam of light into the water stream ejected by said adjacent nozzle.

13. The water display of claim 12 wherein said fountain housing has a grate covering its open end, said grate having openings extending therethrough adjacent the location of said nozzles and said lights.

14. The water display of claim 12 wherein each of said light fixtures contains a plurality of LED bulbs, some bulbs capable of emitting red light, some bulbs capable of emitting blue light, and some bulbs capable of emitting green light.

15. The water display of claim 14 wherein said light fixtures each contain twenty seven LED bulbs, nine of which bulbs are capable of emitting red light, nine of which bulbs are capable of emitting blue light, and nine of which bulbs are capable of emitting green light.

16. The water display of claim 14 wherein said bulbs are electrically connected to a controller adapted to energize certain of said bulbs at certain times.

17. The water display of claim 16 wherein said controller is adapted to energize said bulbs in response to an audio input.

18. A self-contained water display comprising:
a cylindrical fountain housing, said fountain housing having a floor, a cylindrical wall, and an open top, said fountain housing containing at least one fountain nozzle extending vertically upwardly and at least one pump adapted to supply water to said nozzle with sufficient volumetric throughput to cause a vertical water stream to be ejected from said nozzle;
a vertically disposed transparent cylindrical cover surrounding said fountain housing, said fountain housing being located in a lower portion of said transparent cylindrical cover, said transparent cylindrical cover having a height above said nozzle that is at least as great as the height of said vertical water stream; and
a transparent aquarium surrounding said fountain housing and the lower portion of said transparent cylindrical cover.

19. The water display of claim 18 wherein said transparent aquarium is cylindrical and has a common axis with said fountain housing and said transparent cylindrical cover.

20. The water display of claim 18 wherein said transparent aquarium has a lid with a circular opening extending therethrough adapted to receive said transparent cylindrical cover.

21. The water display of claim 18 wherein said aquarium is surrounded by a lightweight shell cover simulating a rock, said shell cover having an irregularly shaped base.

22. The water display of claim 21 wherein said transparent aquarium rests on shelf, said shelf resting on a floor that has substantially the same footprint as the base of said shell, and said shelf and said shell have a height that allows a substantial portion of said transparent aquarium to extend thereabove.

* * * * *